United States Patent
Fujii et al.

(10) Patent No.: US 10,164,355 B2
(45) Date of Patent: Dec. 25, 2018

(54) MOTOR DRIVE DEVICE

(71) Applicant: FANUC CORPORATION, Yamanashi (JP)

(72) Inventors: Shouta Fujii, Yamanashi (JP); Kaname Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/805,736

(22) Filed: Nov. 7, 2017

(65) Prior Publication Data
US 2018/0131108 A1 May 10, 2018

(30) Foreign Application Priority Data
Nov. 9, 2016 (JP) .................. 2016-219142

(51) Int. Cl.
| | |
|---|---|
| H01R 9/24 | (2006.01) |
| H01R 9/18 | (2006.01) |
| H01R 4/34 | (2006.01) |
| H02M 7/00 | (2006.01) |
| H02P 5/74 | (2006.01) |

(52) U.S. Cl.
CPC ............. *H01R 9/2466* (2013.01); *H01R 4/34* (2013.01); *H01R 9/18* (2013.01); *H01R 9/2458* (2013.01); *H02M 7/003* (2013.01); *H02P 5/74* (2013.01)

(58) Field of Classification Search
CPC ......... H01H 1/42; H01H 31/28; H01R 9/2466
USPC ...... 200/6 R, 7, 15, 6 A, 48 A, 48 KB, 48 V, 200/48 SV, 48 CB, 244
See application file for complete search history.

(56) References Cited

U.S. PATENT DOCUMENTS

| | | | |
|---|---|---|---|
| 2,917,612 A | * | 12/1959 | Chabot .................. H01H 1/42 200/254 |
| 2009/0015992 A1 | | 1/2009 | Nohara et al. |
| 2015/0229246 A1 | | 8/2015 | Matsumoto |

FOREIGN PATENT DOCUMENTS

| | | |
|---|---|---|
| JP | 2003-257516 A | 9/2003 |
| JP | 2006-114232 A | 4/2006 |
| JP | 2009-225497 A | 10/2009 |
| JP | 2014-056775 A | 3/2014 |
| JP | 2015-154566 A | 8/2015 |
| WO | 2007/094162 A1 | 8/2007 |

OTHER PUBLICATIONS

Japanese Office Action dated Jan. 23, 2018, in connection with corresponding JP Application No. 2016-219142 (4 pgs.).

* cited by examiner

*Primary Examiner* — Ross N Gushi
(74) *Attorney, Agent, or Firm* — Maier & Maier, PLLC

(57) ABSTRACT

This motor drive device includes a first motor driving unit, a first terminal block 11 attached to the first motor driving unit, a second motor driving unit, a second terminal block attached to the motor driving unit, a first short bar whose one end portion is attached to the first terminal block so that the first short bar can be rotated around a first axis line, and a second short bar whose one end portion is attached to the first terminal block so that the second short bar can be rotated around a second axis line, the other end sides thereof can be placed at a connection position so that the other end sides can be connected to the second terminal block, and at a retract position which is distant from the second terminal block by rotation of the first and the second short bars.

2 Claims, 7 Drawing Sheets

MOTOR DRIVE DEVICE

CROSS-REFERENCE TO RELATED APPLICATIONS

This application is based on and claims priority to Japanese Patent Application No. 2016-219142 filed on Nov. 9, 2016, the entire content of which is incorporated herein by reference.

TECHNICAL FIELD

The present invention relates to and a motor drive device, and particularly relates to a motor drive device including a plurality of motor driving units connected with each other through connection members.

BACKGROUND ART

As illustrated in FIG. 6, a known motor drive device (refer to PTL 1, for example) includes a first motor driving unit 110 that functions as a converter, and a second motor driving unit 120 that functions as an inverter. The first motor driving unit 110 and the second motor driving unit 120 are connected with each other through a pair of short bars 131, 132.

Also, in a terminal block to which a plurality of electric power lines are connected, a plurality of input terminals which are respectively connected to the end portions of the electric power lines are at positions where the positions of the input terminals, to which the electric power lines are connected, are shifted in the longitudinal direction of the electric power lines so that the positions of the end portions of each adjacent pair of the electric power lines are shifted in the longitudinal direction of the electrical power line is known.

CITATION LIST

Patent Literature

{PTL 1}
Japanese Unexamined Patent Application, Publication No. 2009-225497
{PTL 2}
Japanese Unexamined Patent Application, Publication No. 2006-114232

SUMMARY OF INVENTION

An embedment of the present invention is a motor drive device having at least two motor driving units for driving a motor, wherein each of the motor driving units includes a terminal block, the motor drive device further comprising: a first short bar whose one end portion is attached to either one of the terminal block of an adjacent pair of the motor driving units so that the first short bar can be rotated around a first axis line; and a second short bar whose one end portion is attached to either one of the terminal blocks of the adjacent pair of the motor driving units so that the second short bar can be rotated around a second axis line which is substantially parallel to the first axis line; wherein the other end portion of the first short bar can be placed at a connection position so that the other end side of the first short bar can be connected to the terminal block of the adjacent motor driving unit, and can be placed at retraction position which is distant from the terminal block of the adjacent motor driving unit by rotation around a certain position of the one end portion of the first short bar, and the other end portion of the second short bar can be placed at a connection position so that the other end side of the second short bar can be connected to the terminal block of the adjacent motor driving unit, and can be placed at a retraction position which is distant from the terminal block of the adjacent motor driving unit by rotation around a certain position of the one end portion of the second short bar.

DESCRIPTION OF EMBODIMENTS

A motor drive device according to an embodiment of the present invention will be described below with reference to the accompanying drawings.

Figure 1:
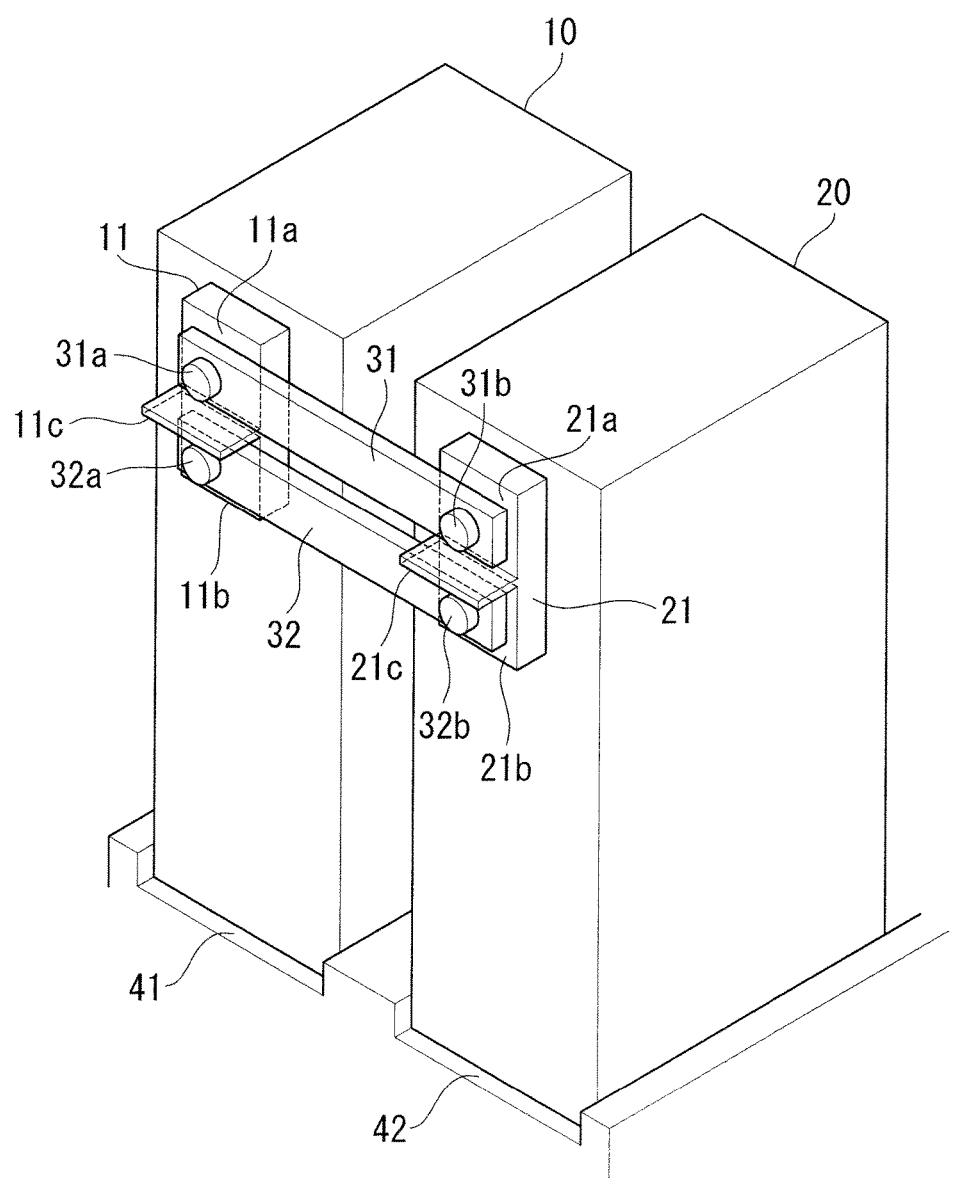
FIG. 1 is an essential part perspective view schematically illustrating a motor drive device according to an embodiment of the present invention.
Figure 2:
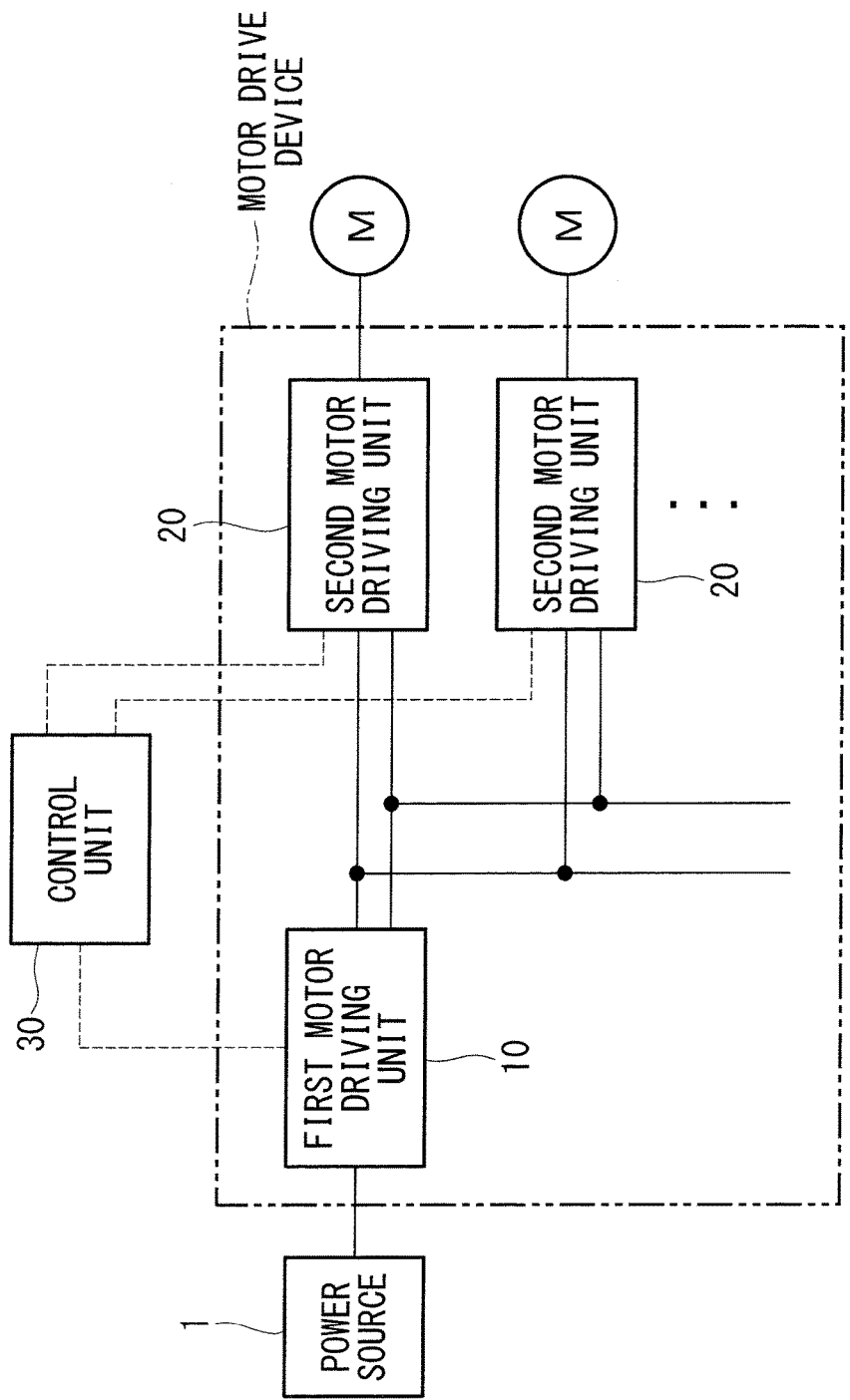
FIG. 2 is a schematic block diagram of the motor drive device according to the present embodiment.

As illustrated in FIGS. 1 and 2, this motor drive device includes a first motor driving unit (converter) 10 configured to convert alternating-current power supplied from a power source 1 into direct-current power, and at least one second motor driving unit (inverter) 20 connected with the first motor driving unit 10 through a first short bar 31 and a second short bar 31, and configured to convert the direct-current power supplied from the first motor driving unit 10 into alternating-current power and supply the alternating-current power to a motor M such as a servomotor. The motor M is provided in, for example, a robot, a machining tool, or an industrial machine. The above-described motor drive device is controlled by a control unit 30. In order to simplify the following description, a case in which only one second motor driving unit is provided will be explained below.

The first motor driving unit 10 has, for example, a direct-current conversion circuit housed in a rectangular housing and configured to convert alternating-current power into direct-current power. The second motor driving unit 20 has, for example, an alternating-current conversion circuit housed in a rectangular housing and configured to convert the direct-current power from the first motor driving unit 10 into alternating-current power having characteristics in accordance with a control signal from the control unit 30 and supply this alternating-current power to the motor M.

The control unit 30 includes a CPU, a storage device such as a RAM, a ROM, and the like, and an input unit, and operates based on a control program stored in the storage device to transmit control signals to the first and second motor driving units 10 and 20. Accordingly, the motor M operates based on the control program.

Figure 3:
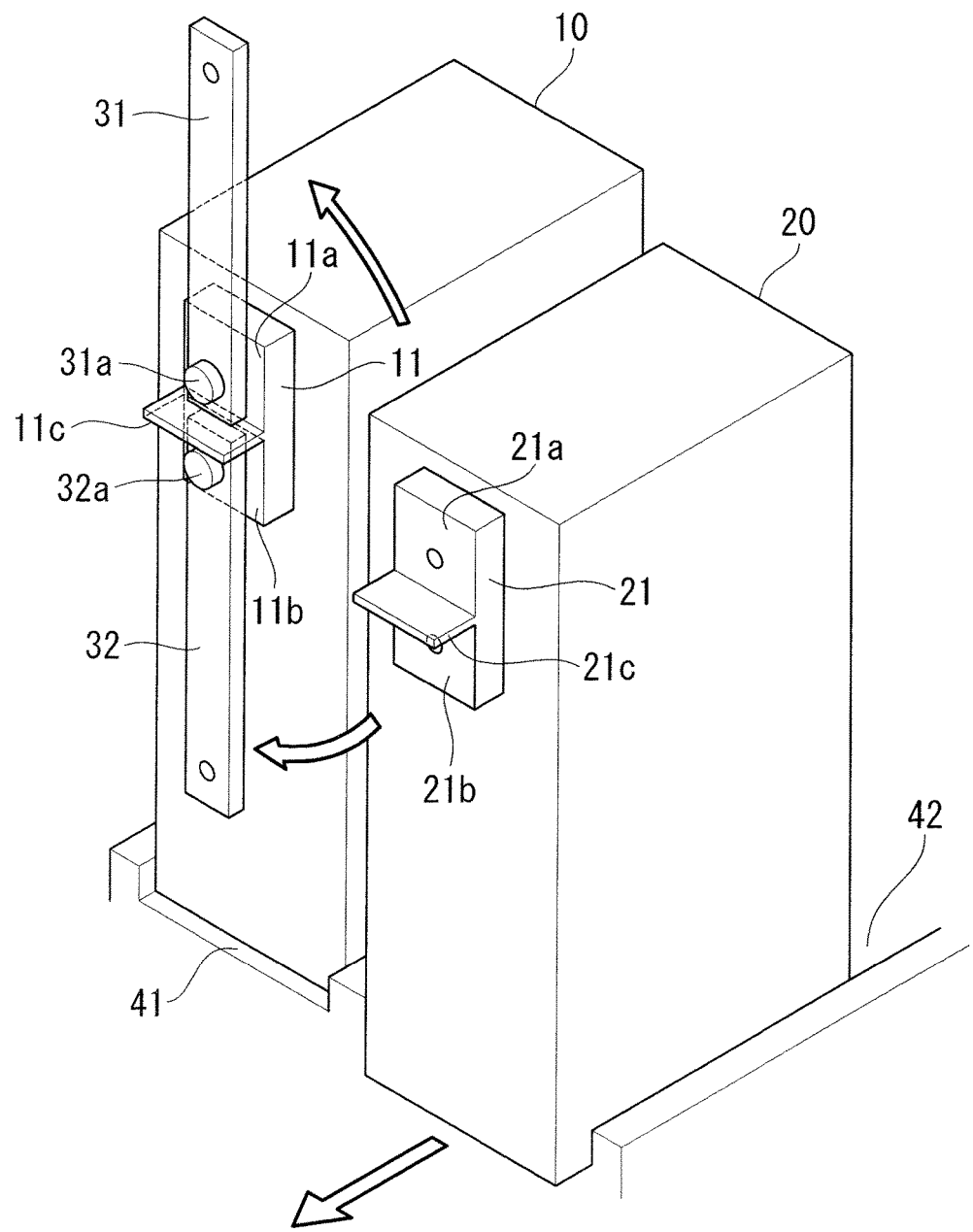
FIG. 3 is a diagram for explaining operation when replacing a second motor driving unit of the motor drive device according to the present embodiment.

The first motor driving unit 10 is housed in a first housing portion 41 provided inside the motor drive device, and the second motor driving unit 20 is housed in a second housing portion 42 provided inside the motor drive device. For convenience of explanation, FIGS. 1 and 3 shows a case where only one second motor driving unit 20 is provided.

The first motor driving unit 10 is inserted into the first housing portion 41 from a front side toward a back side to be housed in the first housing portion 41. The second motor driving unit 20 is inserted into the second housing portion 42 from the front side toward the back side to be housed in the second housing portion 42.

The first motor driving unit 10 includes a first terminal block 11, and the second motor driving unit 20 includes a second terminal block 21. The terminal blocks 11 and 21 are fixed to front surfaces (surfaces on the front side) of the motor driving units 10 and 20, respectively.

The front surface (surface on the front side) of the terminal blocks 11, 21 are each provided with a first connection surface 11a, 21a to which the first short bar 31 is connected, a second connection surface 11b, 21b to which the second short bar 32 is connected, a partition 11c, 21c which are placed between the first connection surface 11a, 21a and the second connection surface 11b, 21b, and which protrudes toward the front side relative to the first connection surface 11a, 21a and the second connection surface 11b, 21b. At least the partitions 11c and 21c are made of an insulator.

The first short bar 31 is a metallic plate-like member, and a through-hole which penetrates the first short bar 31 in the thickness direction thereof is formed in one end portion of the first short bar 31 in the longitudinal direction. A fastening member 31a having a male screw part is inserted into the through-hole, and the male screw part of the fastening member 31a is screwed into a female screw hole provided in the first connection surface 11a, so that the one end portion of the first short bar 31 is attached to the first connection surface 11a of the first terminal block 11.

The second short bar 32 is also a metallic plate-like member, and a through-hole which penetrates the second short bar 32 in the thickness direction thereof is formed in one end portion of the second short bar 32 in the longitudinal direction. A fastening member 32a having a male screw part is inserted into the through-hole, and the male screw part of the fastening member 32a is screwed into a female screw hole provided in the second connection surface 11b, so that the one end portion of the second short bar 32 is attached to the second connection surface 11b of the first terminal block 11. The fastening members 31a, 32a are long in the front-and-rear direction, and the fastening members 31a, 32a electrically connect the first and the second short bars 31, 32 with the direct-current conversion circuit.

The first short bar 31 and the second short bar 32 can be rotated around the center axes of the fastening members 31a, 32a. Specifically, the first and the second short bars 31, 32 can be rotated to a first rotation position (connection position) where the first and second short bars 31, 32 extend toward the second motor driving unit 20 so that the first and the second short bars 31, 32 are placed parallel with each other as shown in FIG. 1, and to a second rotation position (retract position) where the other end sides of the first and the second short bars 31, 32 are distant from each other, and the first and second short bars 31, 32 are not placed at a position where the first and the second short bars 31, 32 are overlapped with the second motor driving unit 20 in the front-and-rear direction, as shown in FIG. 3.

At the first rotation position, the other end sides of the first and the second short bars 31, 32 are connected to the first and the second connection surfaces 21a, 21b of the second terminal block 21, respectively. Specifically, the through-holes which penetrate the first and the second short bars 31, 32 in the thickness direction thereof are formed at positions corresponding to the second terminal block 21, the fastening members 31b, 32b having the male screw parts are inserted into the through-holes, and the male screw parts of the fastening members 31b, 32b are screwed into the female screw holes formed in the first and the second connection surfaces 21a, 21b, so that the other end sides of the first and the second short bars 31, 32 are attached to the first and the second connection surfaces 21a, 21b of the second terminal block 21. The fastening members 31b, 32b electrically connect the first and the second short bars 31, 32 with the alternating-current conversion circuit.

Figure 4:
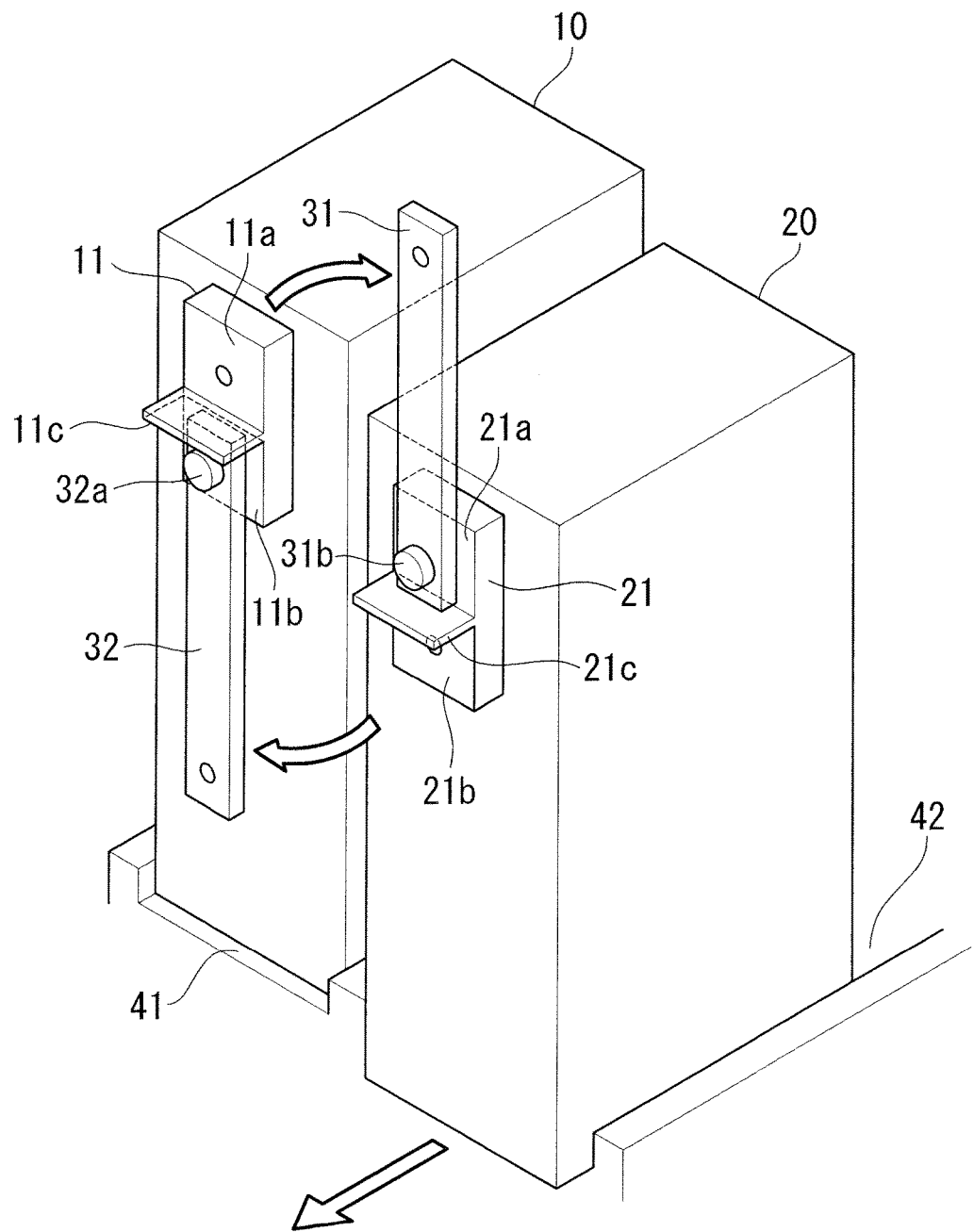
FIG. 4 is a diagram for explaining operation when replacing the second motor driving unit of the motor drive device according to the present embodiment.

On the other hand, the first short bar 31 and the second short bar 32 can be rotated around the center axes of the fastening members 31b, 32b. For example, from a state where the first short bar 31 and the second short bar 32 are placed at the connection positon as shown in FIG. 1, the first and the second short bars 31, 32 can be rotated to the retract position where the one end side of the first short bar 31 is distant from the first terminal block 11 and the one end side of the second short bar 32 is distant from the second terminal block 21 as shown in FIG. 4. In this case, the side which is fastened by the fastening member 32b is referred to as the one end side of the second short bar 32, and the side which comes into contact with the first terminal block 11 is referred to as the other end side of the second short bar.

According to the present embodiment, for example, the first and the second short bars 31, 32 are rotated to the first rotation position when connecting the first motor driving unit 10 with the second motor driving unit 20. On the other hand, at the time of replacing the second motor driving unit 20, by rotating the first and the second short bars 31, 32 to the second rotation position, the second motor driving unit 20 can be moved toward the front side and replaced without removing the first and the second short bars 31, 32 from the first terminal block 11. Therefore, it is possible to shorten the time necessary to replace the second motor driving unit 20 and to prevent the situation where the short bars 31, 32 and the fastening members 31a, 32a thereof are lost at the time of replacement.

Also, the partition 21c of the second terminal block 21 prevents the first short bar 31 and the second short bar 32 from contacting with each other when the first and second short bars 31, 32 are placed at the first rotation position. Further, the first short bar 31 and the second short bar 32 can be rotated to the second rotation position from the first rotation position since the partition 21c is the only protruding object which protrudes toward the front side relative to the two connection surfaces 21a, 21b on the second terminal block 21.

In addition, the first short bar 31 and the second short bar 32 can be rotated smoothly toward the second rotation position from the first rotation position since the partition 11c is the only protruding object which protrudes toward the front side relative to the two connection surfaces 11a, 11b on the first terminal block 11.

Moreover, it is possible to form a space between the first housing portion 41 and the second housing portion 42, and to place another motor driving unit 20 between the first motor driving unit 10 and the second motor driving unit 20 so that the first motor driving unit 10 the two motor driving units 20 with one first short bar 31 and one second short bar 32.

In this case, the through-holes which penetrate the first and the second short bars 31, 32 are formed at positions corresponding to the terminal block 21 of the other motor driving unit 20, and at this position, the first and the second short bars 31, 32 are attached to the terminal block 21 of the other motor driving unit 20. In this case, the two second motor driving units 20 can be moved toward the front side and replaced without removing the first and the second short bars 31, 32 from the first terminal block 11.

Figure 5:
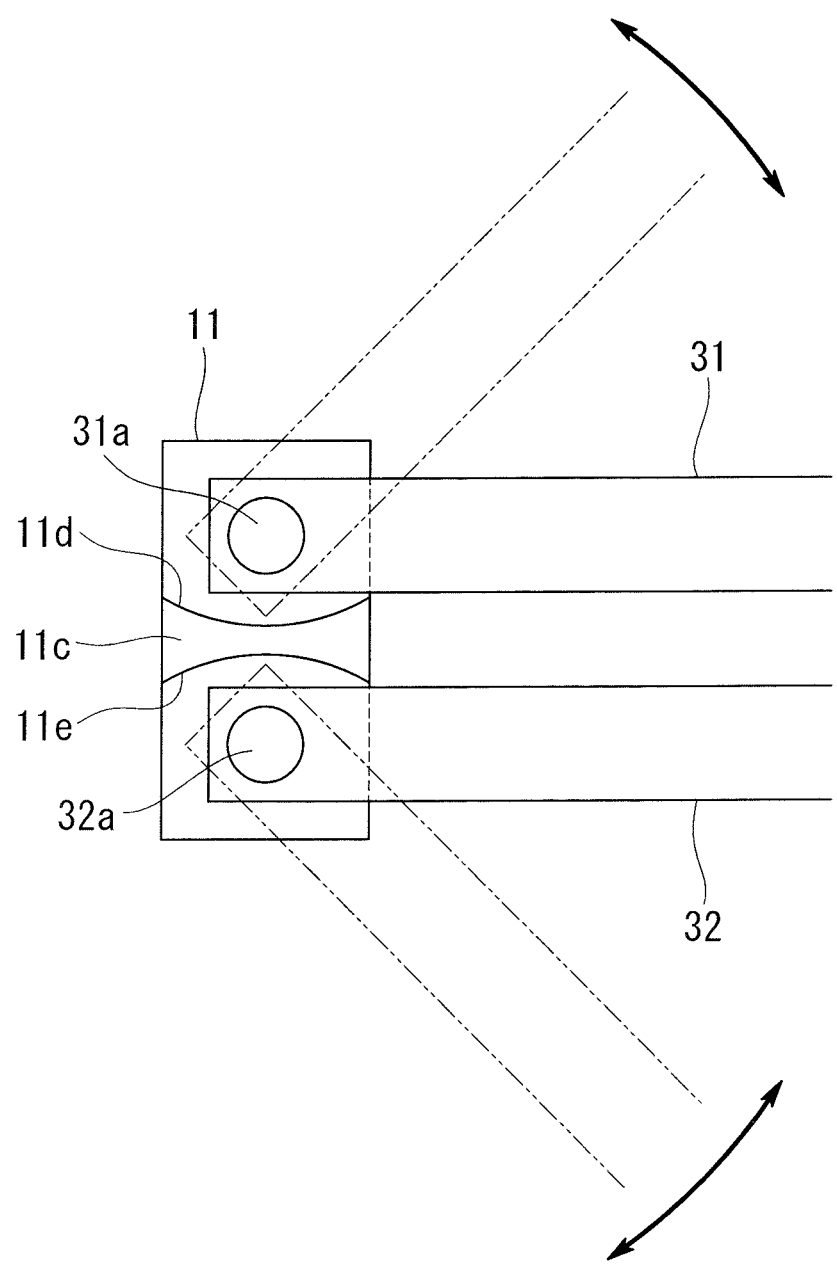
FIG. 5 is a front view of an essential part of the motor drive device according to the present embodiment.

The present embodiment illustrates that the surface of the partition 11c which faces the first short bar 31 and the surface of the partition 11c which faces the second short bar 32 are flat. Whereas, as shown in FIG. 5, it is possible to provide a concave surface 11d which corresponds to the rotation radius of the one end side of the first short bar 31 on the surface of the partition lie of the first terminal block 11, which faces the first short bar 31, and to provide concave surface 11e which corresponds to the rotation radius of the one end side of the second short bar 32 on the surface which faces the second short bar 32.

With the above mentioned configuration, the surfaces which face the first and the second short bars 31, 32 on the partition 11c of the first terminal block 11 do not interfere the first and the second short bars 31, 32 which rotates because such surfaces have the concave surfaces 11d, 11e. Therefore, in comparison with a case where the concave surfaces 11d, 11e are not provided, it is possible to shorten the distance between the rotation center of the first short bar 31 and the rotation center of the second short bar 32 on the first terminal block 11, which increases the degree of freedom in design.

In addition, the present embodiment illustrates the first motor driving unit 10 as the converter, and the second motor driving unit 20 as the invertor. On the other hand, when the first motor driving unit 10 is the inverter, and the first motor driving unit 20 is the converter, one end sides of the first and the second short bars 31, 32 can be rotatably attached to the first terminal block 11 of the first motor driving unit 10.

Further, the first motor driving unit 10 and the second motor driving unit 20 can be a unit for driving a motor other than the invertor or the convertor.

Figure 6:
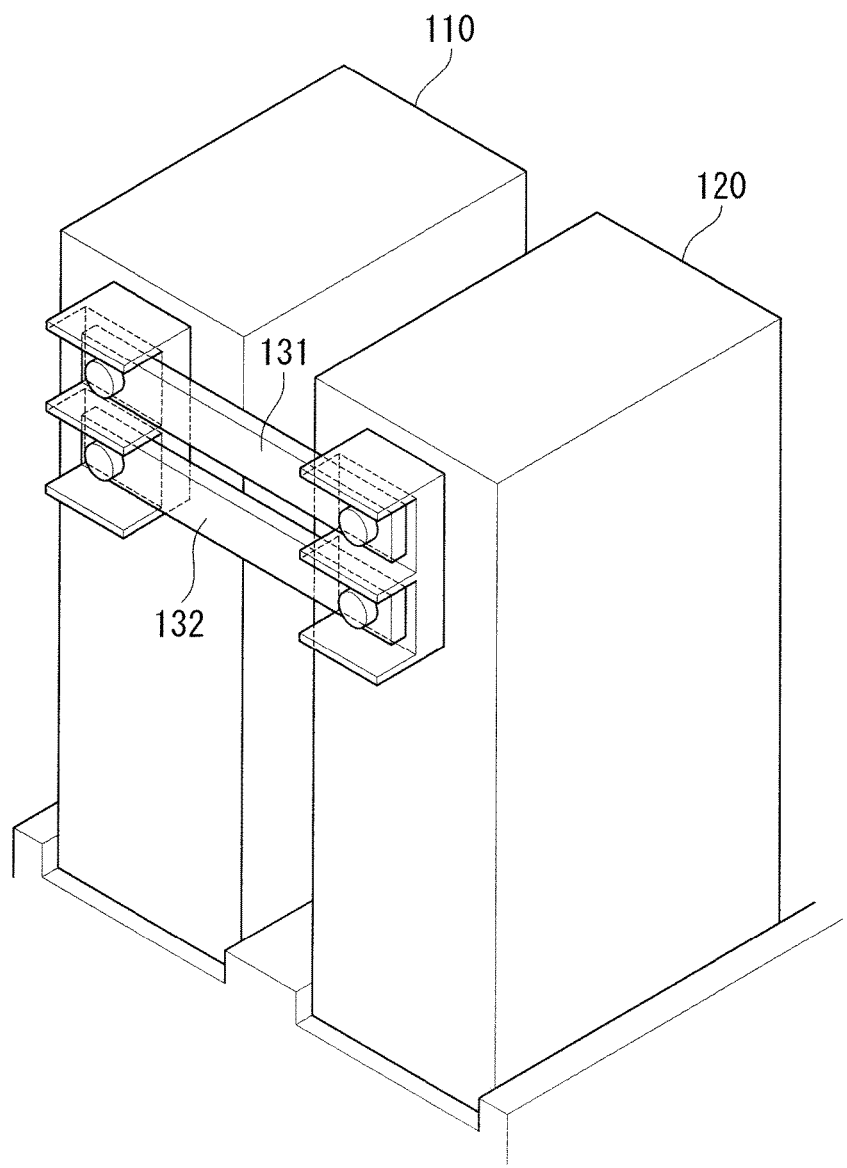
FIG. 6 is an essential part perspective view schematically illustrating a conventional motor drive device.
Figure 7:
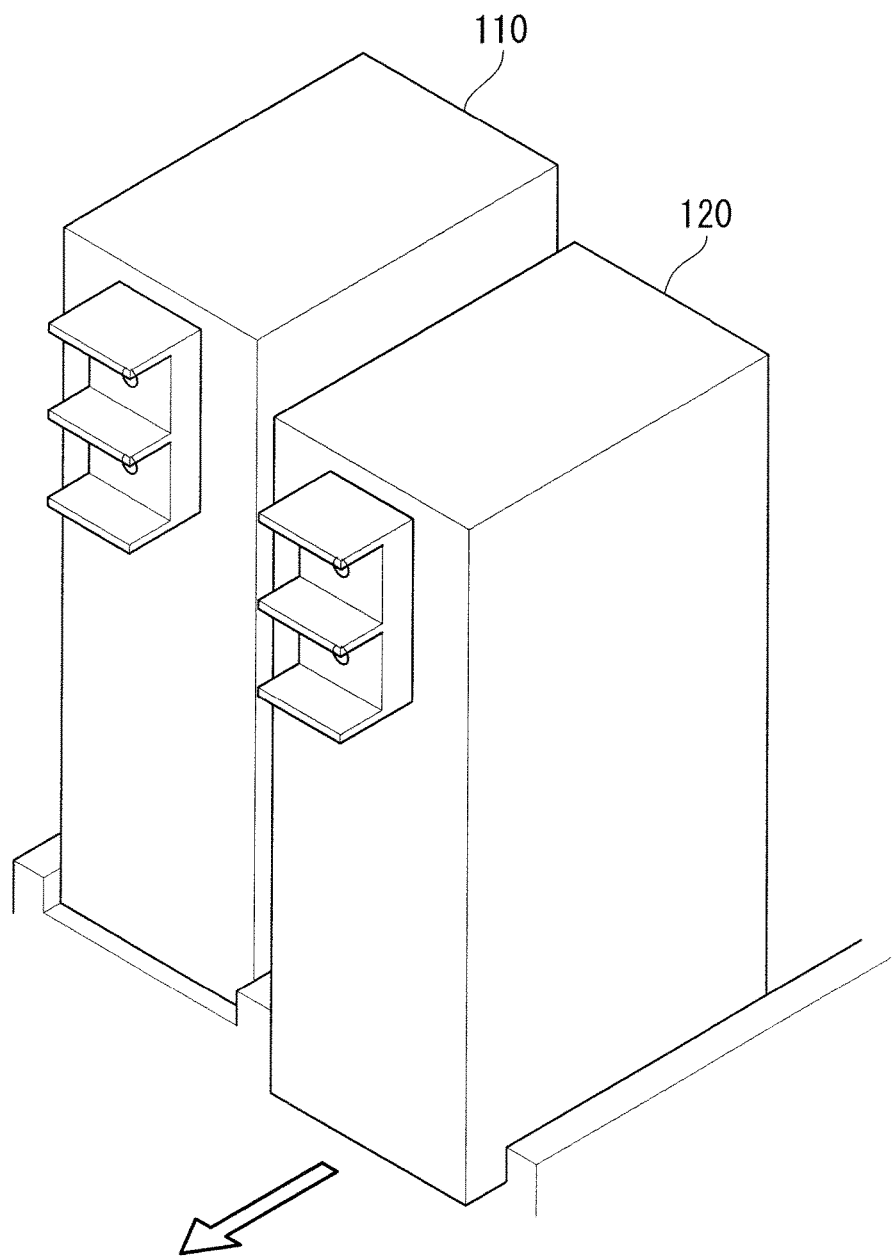
FIG. 7 is a diagram for explaining operation when replacing a second motor driving unit of the conventional motor drive device.

In the motor drive device shown in FIG. 6, the second motor driving unit 120 is replaced in accordance with, for example, a required specification with regard to a driven motor. At the time of replacement, for example, the second motor driving unit 120 is moved toward a front side and removed as illustrated in FIG. 7, and then another second motor driving unit 120 is inserted from the front side toward a back side.

At this stage, the pair of short bars 131, 132 are removed from both of the first motor driving unit 110 and the second motor driving unit 120 because the pair of short bars 131, 132 being placed on the front side of the second motor driving unit 120 would otherwise prevent the movement of the second motor driving unit 120 toward the front side. Since the pair of short bars 131, 132 need to be removed from both of the first motor driving unit 110 and the second motor driving unit 120 when the second motor driving unit 120 is to be replaced, this removal work leads to a longer time necessary for the replacement of the second motor driving unit 120.

The inventors have arrived at the following aspects of the present invention in order to make an improvement in the aforementioned circumstances.

An embedment of the present invention is a motor drive device having at least two motor driving units for driving a motor, wherein each of the motor driving units includes a terminal block, the moor drive device further comprising: a first short bar whose one end portion is attached to either one of the terminal block of an adjacent pair of the motor driving units so that the first short bar can be rotated around a first axis line; and a second short bar whose one end portion is attached to either one of the terminal blocks of the adjacent pair of the motor driving units so that the second short bar can be rotated around a second axis line which is substantially parallel to the first axis line; wherein the other end portion of the first short bar can be placed at a connection position so that the other end side of the first short bar can be connected to the terminal block of the adjacent motor driving unit, and can be placed at a retraction position which is distant from the terminal block of the adjacent motor driving unit by rotation around a certain position of the one end portion of the first short bar, and the other end portion of the second short bar can be placed at a connection position so that the other end side of the second short bar can be connected to the terminal block of the adjacent motor driving unit, and can be placed at a retraction position which is distant from the terminal block of the adjacent motor driving unit by rotation around a certain position of the one end portion of the second short bar.

More specifically, this motor drive device has a first motor driving unit for driving a motor, a first terminal block which is attached to the first motor driving unit, a second motor driving unit for driving a motor, and a second terminal block which is attached to the second motor driving unit, and this motor drive device further includes a first short bar whose one end portion is attached to the first terminal block or the second terminal block so that the first short bar can be rotated around a first axis line, and a second short bar whose one end portion is attached to the first terminal block or the second terminal block so that the second short bar can be rotated around a second axis line which is substantially parallel to the first axis line. The other end sides of the first and the second short bars can be placed at a connection position which can be connected to the first terminal block or the second terminal block, and at a retract position which is distant from the first terminal block or the second terminal block by rotation of the first and the second short bars.

In the present embodiment, for example, when connecting the first motor driving unit and the second motor driving unit, the first and the second short bars are rotated to the connection position where the first and the second short bars can be connected to the second terminal block, and when replacing the second motor driving unit, the first and the second short bars can be rotated to the retract position which is distant from the second terminal block. Therefore, the second motor driving unit can be replaced without removing the first and the second short bars from the first terminal block. Accordingly, it is possible to shorten the time necessary to replace the motor driving unit. And it is advantageous for preventing the loss of the short bars and fastening members thereof at the time of replacement.

In the above described embodiment, the terminal block has a partition which is the only protruding object protruding toward a direction substantially parallel to the first or the second axis line of the first and the second short bars, and the partition may be placed between the other end side of the first short bar and the other end side of the second short bar which are placed at the connection positions.

More specifically, the first terminal block or the second terminal block has two contacting surfaces to which the other end sides of the first and the second short bars are connected, respectively, and the partition which is the only protruding object protruding toward the direction substantially parallel to the first axis line or the second axis line relative to the two contacting surfaces, and the partition may be placed between the other end side of the first short bar and the other end side of the second short bar which are placed at the connection position.

With this configuration, the partition of the first terminal block or the second terminal block prevents the first short bar and the second short bar from contacting with each other when the first and the second short bars are place at the connection position, and from the viewpoint of electrical insulation, it is possible to downsize the entire terminal block. Also, in the first and the second terminal block, since the partition is the only protruding object which protrudes toward the direction substantially parallel to the first axis line relative to the two contacting surfaces, it is possible to rotate the first short bar and the second short bar to the retract position from the connection position.

In addition, with the above described embodiment, each of the terminal blocks preferably has a partition which is provided between the first short bar and the second short bar, wherein a surface of the partition which faces at least one of the first short bar and the second short bar has a concave surface whose concave is depending on a rotation radius of the one end portion of the first short bar or the second short bar.

With this configuration, the partition of the first terminal block prevents the first short bar and the second bar from contacting with each other, and from the viewpoint of electrical insulation, it is possible to further downsize the entire terminal block. Further, regarding the partition of the first terminal block, when at least the surface which faces the first short bar has the concave surface, the surface does not interfere the first short bar. Accordingly, in comparison with a case where the surface does not have the concave surface, it is possible to shorten the distance between the rotation center position of the first short bar and the rotation center position of the second position on the first terminal block, which increases the freedom of design.

The aforementioned aspects can improve work efficiency when replacing a motor driving unit.

REFERENCE SIGNS LIST 1 power source
10 first motor driving unit
11 first terminal block
11c partition
20 second motor driving unit
21 second terminal block
21c partition
30 control unit
31 first short bar
32 second short bar
41 first housing portion
42 second housing portion
M motor

The invention claimed is:

1. A motor drive device comprising:
at least two motor driving units for driving a motor, wherein each of the motor driving units includes a terminal block,
the motor drive device further comprising:
a first short bar whose one end portion is attached to either one of the terminal block of an adjacent pair of the motor driving units so that the first short bar can be rotated around a first axis line; and
a second short bar whose one end portion is attached to either one of the terminal blocks of the adjacent pair of the motor driving units so that the second short bar can be rotated around a second axis line which is substantially parallel to the first axis line; wherein
the other end portion of the first short bar can be placed at a connection position so that the other end side of the first short bar can be connected to the terminal block of the adjacent motor driving unit, and can be placed at a retraction position which is distant from the terminal block of the adjacent motor driving unit by rotation around a certain position of the one end portion of the first short bar, and
the other end portion of the second short bar can be placed at a connection position so that the other end side of the second short bar can be connected to the terminal block of the adjacent motor driving unit, and can be placed at a retraction position which is distant from the terminal block of the adjacent motor driving unit by rotation around a certain position of the one end portion of the second short bar;
wherein the each of the terminal blocks has a partition which is the only protruding object protruding toward a direction which is substantially parallel to the first or the second axis lines of the first and the second short bars, and
the partition is placed between the other end side of the first short bar and the other end side of the second short bar which are placed at the connection positions.

2. A motor drive device comprising:
at least two motor driving units for driving a motor,
wherein each of the motor driving units includes a terminal block,
the motor drive device further comprising:
a first short bar whose one end portion is attached to either one of the terminal block of an adjacent pair of the motor driving units so that the first short bar can be rotated around a first axis line; and
a second short bar whose one end portion is attached to either one of the terminal blocks of the adjacent pair of the motor driving units so that the second short bar can be rotated around a second axis line which is substantially parallel to the first axis line; wherein
the other end portion of the first short bar can be placed at a connection position so that the other end side of the first short bar can be connected to the terminal block of the adjacent motor driving unit, and can be placed at a retraction position which is distant from the terminal block of the adjacent motor driving unit by rotation around a certain position of the one end portion of the first short bar, and
the other end portion of the second short bar can be placed at a connection position so that the other end side of the second short bar can be connected to the terminal block of the adjacent motor driving unit, and can be placed at a retraction position which is distant from the terminal block of the adjacent motor driving unit by rotation around a certain position of the one end portion of the second short bar;
wherein each of the terminal blocks has a partition which is provided between the first short bar and the second short bar, and
wherein a surface of the partition which faces at least one of the first short bar and the second short bar has a concave surface whose concave is depending on a rotation radius of the one end portion of the first short bar or the second short bar.

\* \* \* \* \*